United States Patent [19]

Hiratsuka et al.

[11] 3,745,448
[45] July 10, 1973

[54] TOROIDAL MAGNETOELASTIC TRANSDUCER FOR MEASURING MECHANICAL FORCES

[75] Inventors: Michio Hiratsuka; Jiro Ishii; Koshi Hiwatashi; Toshiaki Mizoguchi; Yoshikazu Ogata; Makoto Ono; Yoshiyuki Goto, all of Iruma, Japan

[73] Assignee: Kabushiki Kaisha Yaskawa Denki Seisakusho, Fukuoka-ken, Japan

[22] Filed: Mar. 30, 1972

[21] Appl. No.: 239,562

[30] Foreign Application Priority Data
Mar. 30, 1971 Japan................................ 46/19897
Nov. 13, 1971 Japan............................... 46/106103
Nov. 22, 1971 Japan............................... 46/109331

[52] U.S. Cl.......... 324/34 R, 73/88.5 R, 73/141 R, 324/34 ST
[51] Int. Cl............................................. G01r 33/00
[58] Field of Search.................... 324/34 R, 34 MA, 324/34 ST, 43 R; 73/141 R, 88.5 R

[56] References Cited
UNITED STATES PATENTS
3,258,962   7/1966   Dahle............................... 73/141 A
3,483,743   12/1969   Woods............................. 324/34 R
3,577,108   5/1971   Bengtson et al.................. 73/141 A FOREIGN PATENTS OR APPLICATIONS
139,465   1961   U.S.S.R............................. 73/141 A
231,175   11/1968   U.S.S.R........................ 324/43 R
231,177   3/1969   U.S.S.R.......................... 324/34 R Primary Examiner—Robert J. Corcoran
Attorney—Joseph M. Fitzpatrick et al.

[57] ABSTRACT

A device for measuring rather heavy compressive loads applied axially on the annular flat surfaces of a wound type magnetic core, comprising, in addition to the wound type magnetic core, at least one active coil wound in a plane perpendicular to the axis of the magnetic core through a corresponding number of first holes bored radially in the magnetic core, at least one compensating coil wound in a plane parallel to the axis of the magnetic core through a corresponding number of second holes bored radially in the magnetic core at positions sufficiently separated from the first holes, means for applying a constant voltage to each of said active coils and compensating coils, and means for measuring a difference, caused by the application of a load to the magnetic core, between the currents flowing through the active and compensating coils.

8 Claims, 18 Drawing Figures

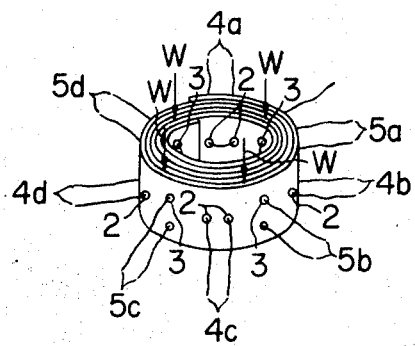
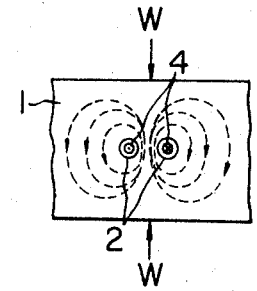
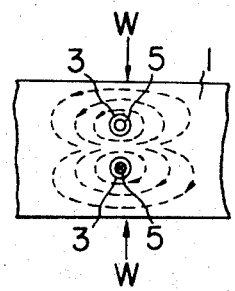
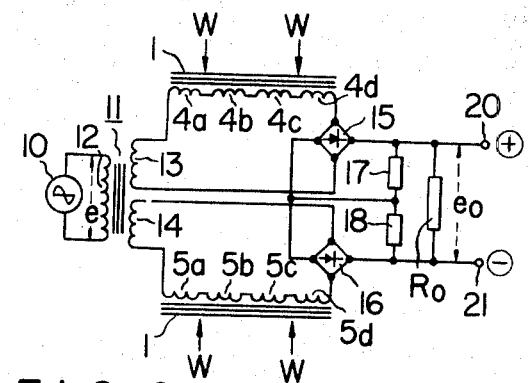
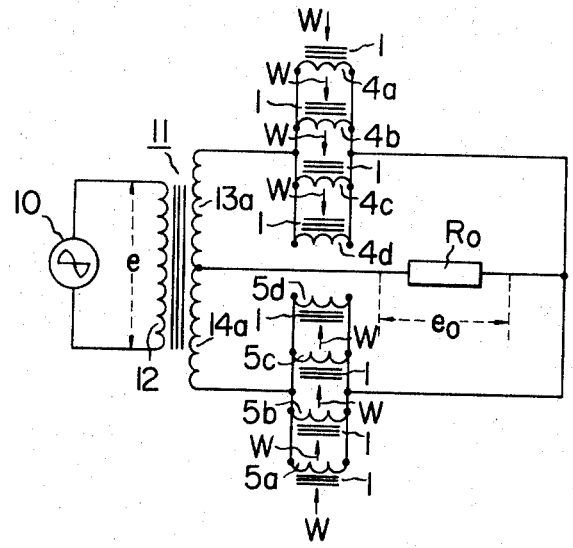

3,745,448
SHEET 4 OF 4
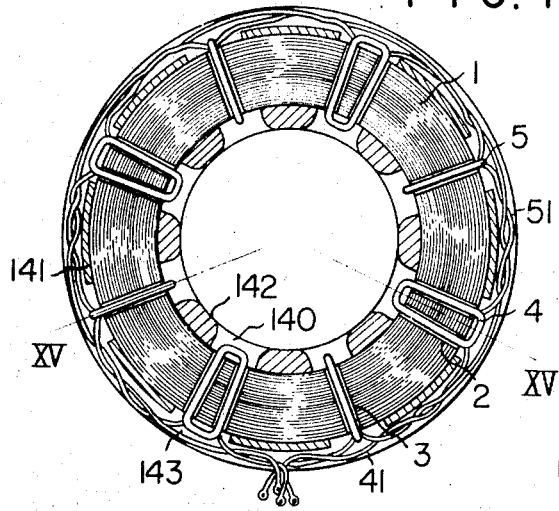
FIG. 14
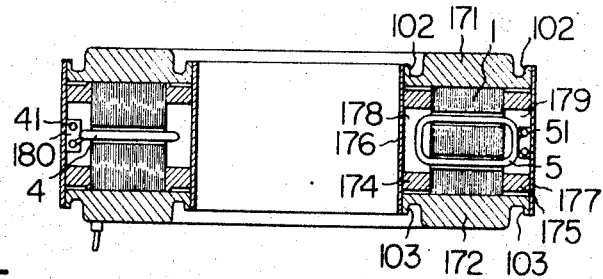
FIG. 17
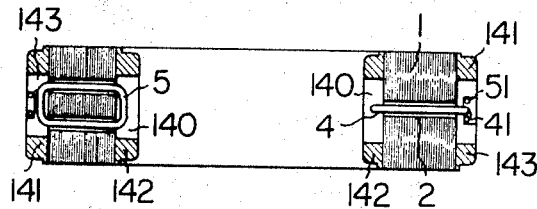
FIG. 15
FIG. 16
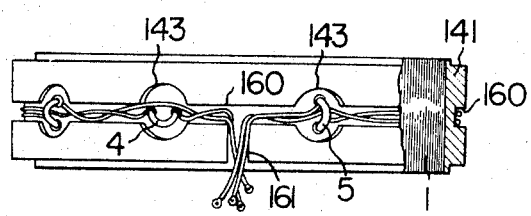
FIG. 18
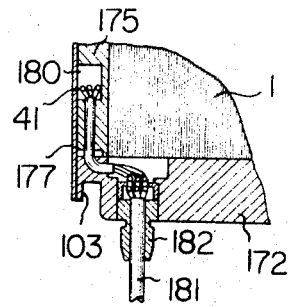

TOROIDAL MAGNETOELASTIC TRANSDUCER FOR MEASURING MECHANICAL FORCES

BACKGROUND OF THE INVENTION

This invention relates generally to devices for measuring mechanical forces and more particularly to devices for measuring large forces such as the rolling loads in a rolling mill and the weight of the contents of a hopper.

More specifically, this invention relates to an original and advanced load measuring device wherein a large load is applied to a toroidal wound magnetic core of the so-called clockspring core type in a direction perpendicular to the core laminating or radial direction, that is, parallel to the core axial direction, and the magnitude of the load is measured by the variation in the magnetostriction (or piezomagnetism, according to proposed terminology) of the wound core.

Among the devices of this class known heretofore, the most widely used types have been strain meters each of which measures variations in the electrical resistance of a strain gauge secured to the inner surface of an iron frame in the shape of a washer or ring, and devices in each of which primary and secondary windings are so wound around a laminated core that they are at 45° of angle with the direction of the applied force and mutually intersect at 90°, and variations in the quantities of electricity supplied from a constant-current power source connected to the primary winding and induced in the second winding are measured.

Since the quantities of the measurands in these devices are extremely small, they give rise to many difficulties such as those in the amplification mechanism.

SUMMARY OF THE INVENTION

A first object of the present invention is to provide a load measuring device having a construction such that offset or eccentric loads and impact loads cannot be easily applied thereon and such as to afford, when the device is used in a machine such as a rolling mill, great convenience in not only measuring magnitudes of loads but also with respect to supplying cooling water to the material being rolled. When it is used in a rolling mill, this load measuring device is in the form of a load cell of toroidal or washer shape installed between the mill housing and the down-screw nut disposed within the housing. Furthermore, the device is provided with a device to amplify the magnetostriction phenomenon due to the operation of the wound core and a calibration device suitable for measuring the magnitude of the electric output and, moreover, has improved linearity of its load - output characteristic.

A second object of this invention is to provide a device for measuring the magnitude of a load applied parallelly to the axial direction of the wound type magnetic core wherein two groups of coils, one being disposed parallelly to the direction of the load (herein called compensating coils) and the other being disposed perpendicular thereto (herein called active coils), are provided in such a manner that each of the coils passes through a hole bored radially through the magnetic core, and a difference caused in the voltages established across these two groups of coils by a variation in the magnetic permeability in the magnetic core due to the application of the load is detected for the determination of the magnitude of the load.

A third object of this invention is to provide a device for measuring the magnitude of a load of the above indicated character wherein individual active coils and compensating coils are connected in series, respectively, and a difference between voltages established across these two groups of coils is utilized for measurement of the magnitude of the load.

A fourth object of this invention is to provide a device for measuring the magnitude of a load of the above indicated character wherein active coils are connected in parallel, and compensating coils are also connected in parallel, and a difference between the voltages established across these two groups of coils is utilized for the measurement of the magnitude of the load.

A fifth object of the invention is to provide a device for measuring the magnitude of a load of the above indicated character wherein several of the active coils and the remaining coils of that group are connected in one pair of diagonally opposed arms of a bridge, and several of the compensating coils and the remaining coils of that group are connected in another pair of diagonally opposed arms of the bridge, a voltage source being placed in one of the diagonal lines of the bridge, and a voltage detecting unit being inserted in the other of the diagonal lines.

A sixth object of the invention is to provide a device for measuring the magnitude of a load of the above indicated character wherein a plurality of additional active coils and compensating coils and corresponding through holes are further provided in the magnetic core, and the coils are grouped in groups each of at least two coils of like kind parallelly disposed in mutually close proximity thereby to improve the sensitivity thereof.

A seventh object of the invention is to provide a device of the above indicated character for measuring the magnitude of a load applied to the magnetic core wherein each of the active coils and the compensating coils is divided into two parts, one being connected as a part of a primary circuit and the other being connected as a part of a secondary circuit of the measuring device.

An eighth object of the invention is to provide a device of the above indicated character for measuring the magnitude of a load applied to the magnetic core wherein pressure receiving annular members are further provided on the wound type magnetic core.

The nature, principle, utility, and further features of the invention will be apparent from the following detailed description when read in conjunction with the accompanying drawings, in which like parts are designated by like reference numerals.

BRIEF DESCRIPTION OF THE DRAWINGS

In the drawings:

FIG. 1 is a perspective view showing the essential construction of a first example of a load measuring device according to this invention;

FIGS. 2 and 3 are fragmentary diagrams respectively indicating distributions of magnetic flux produced in the iron core of the device shown in FIG. 1;

FIGS. 4 and 5 are electrical schematic diagrams respectively showing slightly modified circuitries employed in the first example of the load measuring device;

FIGS. 6 and 7 are electric schematic diagrams indicating second and third embodiments of the invention;

FIG. 14 is a sectional view showing a mechanical construction of the first embodiment of the invention wherein supporting rings are provided on the radially inward and outward peripheral surfaces of the wound type magnetic core;

FIG. 15 is a sectional view taken along the line XV—XV in FIG. 14;

FIG. 16 is a side view, partly shown in section, of the magnetic core shown in FIG. 14;

FIG. 17 is a sectional view showing an example of a pressure receiving arrangement in the first embodiment shown in FIG. 14; and FIG. 18 is a fragmentary sectional view showing lead wires and a lead-out cable in the construction of FIG. 17.

DETAILED DESCRIPTION

Figure 5:
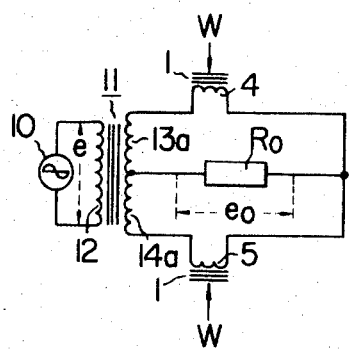

In the first example of the load measuring device according to this invention as illustrated in FIG. 1, there is provided a magnetic core 1 in the form of a toroidal wound core. This core is provided therearound with 8 pairs of small through holes bored in radial directions with respect to the axis of the toroidal core. Four of these pairs are of "first holes" 2 alined in the circumferential direction of the core, while the remaining four pairs are of "second holes" 3 alined in directions parallel to the axis of the core. Active coils 4a through 4d are passed through respective pairs of the first holes 2 and thereby wound parallelly to the diametric directions of the core, while compensating coils 5a through 5d are passed through respective pairs of the second holes 3 and thereby wound perpendicularly to the active coils.

The load measuring device of the above described organization is subjected, during use, to a load W applied thereon in the axial direction thereof with uniform distribution around the annular lateral face of the core as indicated by arrows in the figures. This load W is an axial compression load, an upward force W being exerted upward on the wound core 1 by the down-screw nut (not shown) as indicated by the upwardly directed arrows, as shown in FIGS. 2 and 3, and a reaction force W being exerted downward on the core 1 by the mill housing (not shown) as indicated by the downwardly directed arrows.

This load W gives rise to a magnetostriction effect in the core 1, whereby magnetic flux of a distribution as indicated by the intermittent lines and directions as indicated by arrows in FIG. 2 is produced in the vicinity of each pair of first holes 2 through which one of the active coils 4a through 4d is wound. Consequently, a current flows through the conductor wire of each of these coils as indicated in FIG. 2.

At the same time, the magnetostriction effect produces magnetic flux of a distribution and directions as indicated in FIG. 3 in the vicinity of each pair of second holes 3, whereby a current flows through the conductor wire of each of the perpendicular coils 5a through 5d as indicated in FIG. 3.

The leads of the active coils 4a through 4d and compensating coils 5a through 5d are connected as described below, whereby these coils constitute a part of a device for detecting the magnitudes of the currents induced in these coils in the above described manner. In one example of this device as illustrated by the circuit diagram of FIG. 4, four of the active coils 4a through 4d and four of the compensating coils 5a through 5d are respectively connected in series.

These series connected active coils and compensating coils are further connected to a constant voltage source 10 (of a constant voltage $e$) through a transformer 11. The transformer 11 comprises primary coil 12 and two secondary coils 13, 14 to which the series connected active coils 4a through 4d and compensating coils 5a through 5d are respectively connected. Rectifying circuits 15, 16 are also connected in series with the active and compensating coils, respectively, and d.c. outputs from these rectifying circuits 15, 16 are applied across resistors 17, 18.

In the circuit shown in FIG. 4, there is also provided a resistor $R_o$, and a voltage $e_o$ equal to the difference of two voltages appearing across the resistors 17, 18 is obtained from the output terminals 20, 21 at the two ends of the resistor $R_o$.

In the circuit shown in FIG. 4, there is further provided a device (not shown) for equalizing the output voltages of the active coils 4a through 4d and the compensating coils 5a through 5d when no load is applied to the toroidal shaped magnetic core 1, whereby only a difference voltage caused by the application of a load to the toroidal shaped coil is picked up from the output terminals 20 and 21. With the above described arrangement of the circuit, erroneous influences of the temperature variation or fluctuation of the power source voltage can be completely eliminated, and an accurate indication of the measured load can be thereby obtained.

Figure 13:
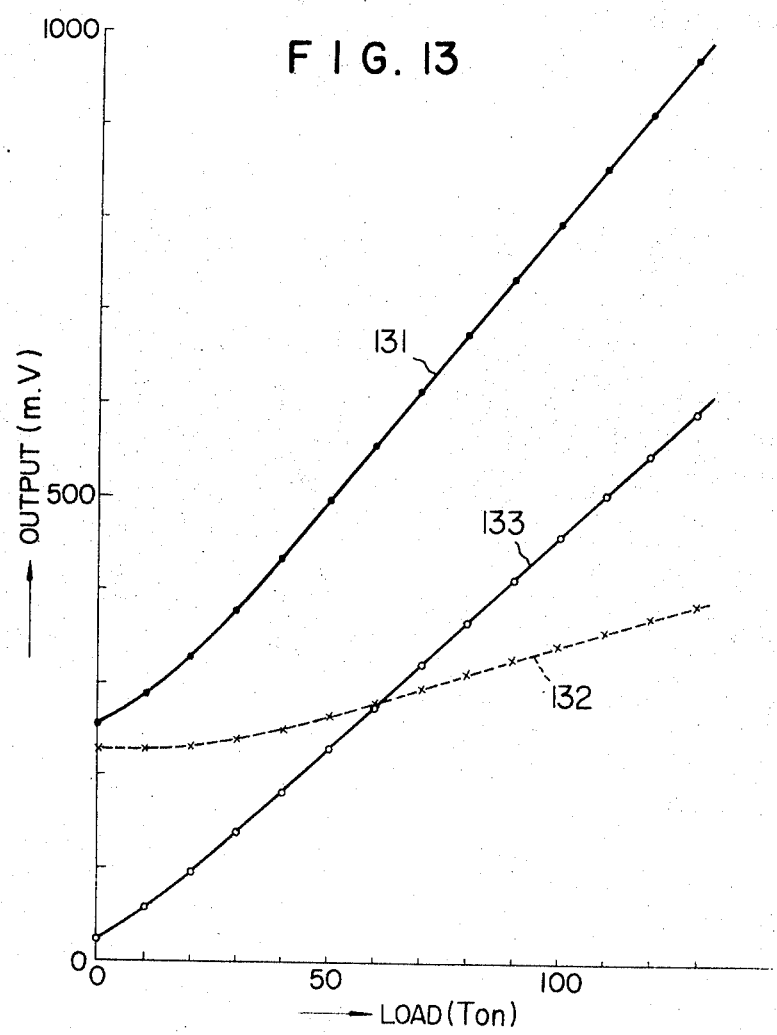
FIG. 13 is a graphical representation of the load-output voltage characteristics of the first embodiment of the invention.

In FIG. 13, there are indicated characteristics of the output voltages of these coils versus the load applied to the toroidal magnetic core. That is, the curve 131 represents the characteristic of the active coils, while the curve 132 represents the characteristic of the compensating coils, and the curve 133 represents a resultant load characteristic of the load measuring device according to the present invention, which indicates the difference between the ordinates of the two curves 131 and 132. Although the curve 133 shows a slight curvature in a portion corresponding to very light loads, this nonlinearity is not a problem because it can be easily compensated for electrically.

More specifically, the nonlinearity of a diode is utilized, and the abovementioned slightly curved portion of this characteristic curve can be compensated for by the output of a linear operator, the operating impedance of which is varied in accordance with the variation of the input voltage.

Of course, the operating impedance of the linear operator can be arbitrarily selected in accordance with the load-output characteristic of the device for measuring the magnitude of a load, and such a compensating circuit is connected to the output terminals 20, 21 as shown in FIG. 4 for producing a compensated voltage, although the compensating circuit is not shown for the sake of clarification of the circuit diagram.

In FIG. 5, there is illustrated a circuit diagram of a second embodiment of the present invention, wherein the output voltages of the active coils and the compensating coils are picked up differentially in accordance with the alternation of a.c. voltage. In this arrangement, a transformer 11 has two secondary winding portions 13a and 14a connected together at an intermediate point, and a resistor $R_o$ is connected between this intermediate point and a junction point of the two groups of coils 4 and 5. Across the resistor $R_o$, a voltage $e_o$ representing the magnitude of the load can be obtained.

It will be apparent that the magnetic flux density (magnetic induction) in the magnetic core is highest at a position between the pair of holes 2 for the active coil 4 as shown in FIG. 2 if the distance between these holes is far smaller than the height of the toroidal shaped wound core, whereby the magnetizing characteristic of the core observed from the active coil 4 will be much influenced by the condition of that portion of the magnetic core wherein the magnetic flux density is held at a maximum value.

The above-mentioned fact is also applicable to the compensating coil 5 passing through the holes 3 as shown in FIG. 3, whereby the magnetizing characteristic of the core observed from the compensating coil 5 is much influenced by the condition of the portion of the magnetic core wherein the magnetic flux density is held at a maximum value.

According to the study of R. Becker, the relation between an externally applied force and the magnetization of a magnetic material in an ideal state can be expressed as $$x = J_s^2/3 \ \sigma_c \lambda$$

wherein $x$ is magnetic susceptibility, $J_s$ is saturation magnetizarion, $\sigma_c$ is a compressive force applied in the direction of the magnetic field, and $\lambda$ is saturation magnetic strain. According to this equation, it is apparent that the magnetic susceptibility $x$ is inversely proportional to the compressive force $\sigma_c$. This means that the magnetic susceptibility $x$ of the core observed from the active coil in FIG. 2 is in an inversely proportional relationship to the compressive load W.

On the other hand, a component of the force applied at a portion of the magnetic core wherein the flux density is at a maximum value along the direction of the magnetic field becomes a tensile force. However, since the magnetic susceptibility cannot take a negative value, the magnetic susceptibility observed from the compensating coil is substantially not varied with respect to a variation of the compressive load W.

When a constant voltage is applied to the coil, an inversely proportional relationship is maintained between the current passing through the coil and the susceptibility of the core at that time, whereby a current proportional to the load flows through the active coil 4, and it may be considered that the current flowing through the compensating coil undergoes almost no change.

In actual practice some deviations from the above described ideal case are found because of the fact that the magnetic susceptibility at no load condition has a certain limitative value and not only the portion between the two holes of the magnetic core but the entire portion around the holes more or less relates to the susceptibility of the magnetic core, and a characteristic as indicated in FIG. 13 can be obtained.

In FIG. 6, there is illustrated a second embodiment of the invention wherein all of the active coils 4a through 4d and compensating coils 5a through 5d are connected in parallel, respectively.

Figure 7:
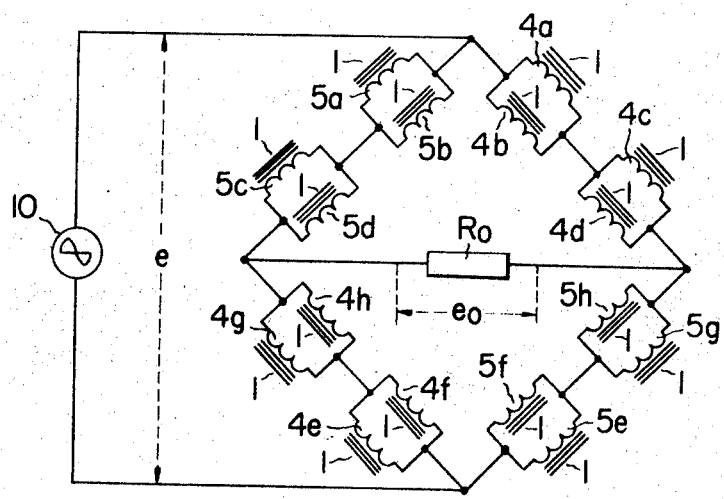

In FIG. 7, there is illustrated a third embodiment of the invention wherein several of the active coils 4a through 4h and several of the compensating coils 5a through 5h are connected in two pairs of diagonally disposed arms of a bridge, respectively, and the constant voltage source 10 is connected in one of the diagonal lines of the bridge. A resistor $R_o$ for detecting the difference voltage $e_o$ is connected in the other diagonal line of the bridge.

Figure 8:
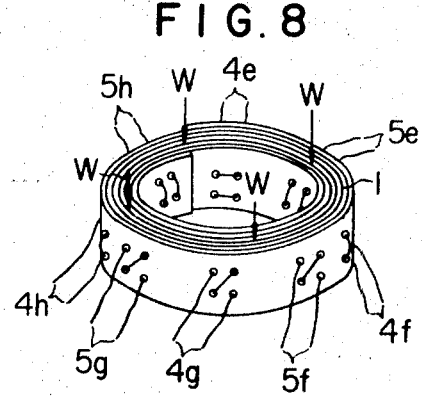
FIG. 8 is a perspective view for indicating the principle of a fourth embodiment of the invention.
Figure 9:
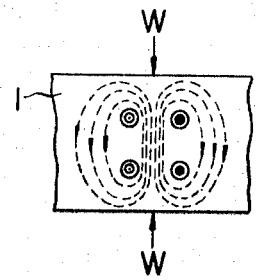
FIGS. 9 and 10 are fragmental diagrams respectively indicating distributions of magnetic fluxes produced in the iron core in the fourth embodiment of the invention.
Figure 10:
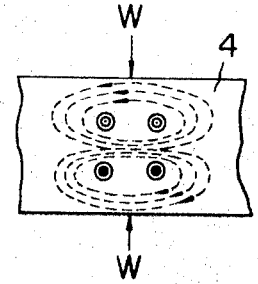

In FIG. 8, there is shown a magnetic core with coils, which is employed for an explanation of the principle of a fourth embodiment of the invention. In this embodiment, two pairs of through holes are bored through the magnetic core instead of one pair as shown in FIGS. 1 through 3, and two pairs of active and compensating coils 4e through 4h and 5e through 5h are wound through these holes as shown in FIG. 8. The distributions of magnetic fluxes around the active coils and the compensating coils are typically indicated in FIGS. 9 and 10.

As will be apparent from these distributions of the magnetic fluxes, the area of portions wherein the magnetic flux density is held maximum is substantially increased in this example, whereby the sensitivity of this measuring device is substantially improved.

Figure 11:
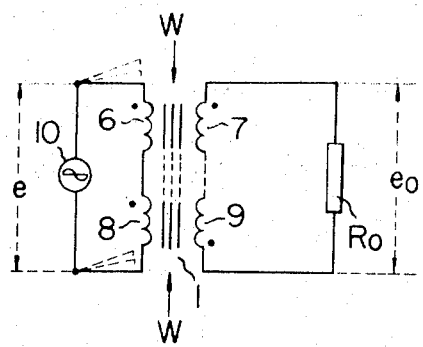
FIG. 11 is a schematic diagram showing an electrical connection in a fifth embodiment of the invention.
Figure 12:
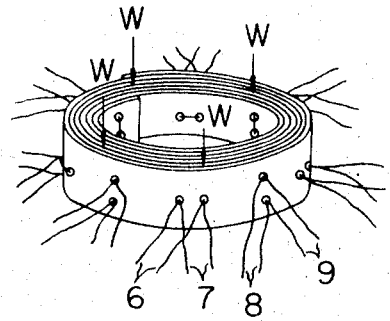
FIG. 12 is a perspective view indicating the principle of the fifth embodiment of the invention.

In FIG. 11, there is shown a circuit diagram of a fifth embodiment of the invention. In this embodiment, each of the active coils is divided into a primary coil 6 and a secondary coil 7, and each of the compensating coils is divided into a primary coil 8 and a secondary coil 9 as shown in FIG. 12. The primary coils 6 and 8 are connected in a primary circuit of a transformer formed by the magnetic core and the coils, while the secondary coils 7 and 9 are connected in a secondary circuit of the same transformer, thus forming a so-called balanced a.c. circuit.

Alternatively, it is of course possible to connect each of the active coils 6 and 7 and the compensating coils 8 and 9 as shown in FIGS. 4, 6, and 7.

In the fifth embodiment of the invention shown in FIG. 11, black dots indicate the starting ends of the winding of the coils. Thus, the primary coils 6 and 8 of the active coil and the compensating coil are wound in the same direction and connected in series with a power source 10. It should be noted that the above described connection is repeated for all of the other primary coils 6, 6, — and 8, 8, — of the active coils and the compensating coils, whereby all of the primary circuits formed by these primary coils are connected in parallel with the a.c. power source 10.

In the above described organization of the circuit shown in FIG. 11, the active coil 6, and the compensating coil 8 in the primary circuit may be connected in parallel with each other and also to the power source 10.

Furthermore, as indicated in FIG. 11, the secondary coils 7 and 9 of the active and compensating coils wound in the same holes as for the above described two primary coils 6 and 8, respectively, are in this example wound reversely (as indicated by the positions of the black dots) and connected in series, so that these two coils constitute the secondary circuit which carries out mathematical operation of the kind as described above with reference to FIG. 4.

Since the load measuring device according to the present invention comprises a wound type magnetic core as described in all of the embodiments of the invention, a load cell of toroidal or washer shape can be fabricated in a simple manner to have high mechanical strength and stability in operation. Furthermore, since a balanced type circuit can be composed of the active coils and compensating coils wound in the single magnetic core, a load measuring device adapted to measure a heavy load and having stability in operation against spontaneous variation of the power source voltage $e_0$ and ambient temperature can be readily produced.

In FIG. 14, there is illustrated an example of mechanical construction of the load measuring device as shown in FIG. 4, wherein supporting rings 141 and 142 are provided on the outer and inner peripheries of the wound type magnetic core, respectively. A sectional view taken along the line XV—XV in FIG. 14 is shown in FIG. 15, and a side view thereof partly sectioned is shown in FIG. 16.

In the construction shown in FIGS. 14, 15, and 16, a wound type magnetic core 1 is provided with a plurality of pairs of radially extending small holes 2 and 3 for winding active coils 4 and compensating coils 5, respectively. The supporting rings 141 and 142 are adapted to fit the outer and inner peripheral surfaces of the magnetic core 1. Through these supporting rings 141 and 142, there are provided a plurality of holes 143 and 140 for accommodating the coil ends of the active coils 4 and the compensating coils 5.

On the outer surface of the outer supporting ring 41 at an axially intermediate portion thereof, a circumferential groove 160 is provided for receiving lead wires 41 and 51 interconnecting the active coils 4 and compensating coils 5, respectively. On the outer surface of the outer supporting ring 141, there is also provided a groove 161 extending perpendicularly from the circumferential groove 160 to a peripheral lateral edge of the outer supporting ring 141, which groove is employed for receiving lead wires for the active coils and the compensating coils.

Because the load measuring device according to the present invention is organized as described above, a magnetostriction phenomenon is caused when a load is applied to the magnetic core, and the magnitude of the load can be measured by detecting a variation in the current flowing through the detecting coils. Furthermore, any tendency to cause buckling in the wound type magnetic core plate can be eliminated by the provision of the supporting rings 141 and 142, whereby accurate measurement of the magnitude of the load is made possible.

Since a plurality of holes 140 and 143 and grooves 160 and 161 are provided in the supporting rings 141 and 142 as described above, the active coils 4 and compensating coils 5 can be installed after the supporting rings 141 and 142 are fitted into their positions. In addition, the coil ends of the active coils and compensating coils can be accommodated in corresponding holes 143 and 140 in the outer and inner supporting rings 141 and 142. Furthermore, lead wires and lead-out cables can be accommodated in the grooves 160 and 161, whereby any tendency of the coils and lead wires to be damaged by outside causes can be substantially eliminated. If it is desired, covers may be further provided over the outer and inner peripheral surfaces of the measuring device so that all of the coils and lead wires are hermetically sealed within these covers.

In FIG. 17, there is illustrated a still another embodiment of the present invention wherein the magnetic core is further provided with a pressure receiving mechanism.

As shown, there is provided a magnetic core 1 made of a magnetic thin sheet plate wound to form a cylindrical or a toroidal structure. Through a plurality of holes provided in the magnetic core 1, active coils 4 and compensating coils 5 are wound, and these coils are connected together by lead wires 41 and 51, respectively. Supporting rings 174 and 175 are also provided on the inner and outer peripheral surfaces of the magnetic core 1, and holes 178 and 179 for accommodating coil ends are bored through the supporting rings 174 and 175. On the outer periphery of the outer supporting ring 175, there is provided a groove 180 for accommodating the lead wires 41 and 51.

A feature of this example is that pressure receiving rings 171 and 172 are further provided on the lateral opposite surfaces of the toroidal core 1. The outer and inner peripheral portions of each of these pressure receiving rings 171 and 172 are formed into annular flange-like configurations as designated by reference numerals 102 and 103 in FIG. 17. An inner sealing cover plate 176 and an outer sealing cover plate 177 are secured to the flange-like portions 102 and 103 of the pressure receiving rings in accordance with any of the conventional sealing practices.

As is best illustrated in FIG. 18, lead wires 41 or 51 and lead-out cables 181 are passed through the groove 180 and a hole provided through, for instance, the lower pressure-receiving ring 172, and led out through a bushing 182 fitted into the hole.

When a load is applied to the pressure-receiving rings 171 and 172, a magnetostriction phenomenon is caused in the magnetic core 1, whereby the magnitude of the load can be measured by measuring the impedance variation of the active coils relative to that of the compensating coils. In this case, each of the flange-like portions 102 and 103 of the pressure-receiving rings is delimited from the intermediate thicker portion of the pressure-receiving rings by an annular part of reduced thickness as best indicated in FIG. 17. Furthermore, the sealing cover plates 176 and 177 are made sufficiently thin. Therefore, there is no possibility of any part of the load being supported through members other than the magnetic core 1, such as the flanges 102, 103 and the cover plates 176, 177, whereby the accuracy of the measurement of the load is not impaired by the existence of the cover plates. The cover plates 176, 177 affords advantageous features such as protection of the magnetic core, active and compensating coils, and lead wires from mechanical damage, corrosive gases, and humidity.

We claim:

1. A load measuring device comprising a magnetic core formed by winding a belt of magnetic material in clockspring fashion into a toroidal shape with a central axis, at least one active coil wound in a plane perpendicular to said axis through a corresponding number of first holes bored radially in the magnetic core, at least one compensating coil wound in a plane parallel to the axis through a corresponding number of second holes bored radially in the magnetic core at positions circumferentially spaced from the first holes, means for applying a constant voltage to each of said coils thereby to cause a current to flow therethrough and means for measuring a difference, caused by an application of a load to the magnetic core, between the currents flowing through the active and compensating coils.

2. A load measuring device as set forth in claim 1 wherein there are a plurality of active coils and a plurality of compensating coils and wherein said active coils are connected in series to form one group of active coils and said compensating coils are connected in series to form one group of compensating coils, and a difference between the voltages obtained across the group of series connected active coils and the group of series connected compensating coils is measured by the measuring means.

3. A load measuring device as set forth in claim 1 wherein there are a plurality of active coils and a plurality of compensating coils and wherein said active coils are connected in parallel to form one group of active coils and said compensating coils are connected in parallel to form one group of compensating coils, and a difference between the voltages obtained across the group of parallel connected active coils and the group of parallel connected compensating coils is measured by the measuring means.

4. A load measuring device as set forth in claim 1 wherein there are a plurality of active coils and a plurality of compensating coils and wherein several of the active coils and the same number of compensating coils are connected in opposite arms of a bridge circuit.

5. A load measuring device as set forth in claim 1 wherein there are a plurality of active coils and a plurality of compensating coils and wherein said active coils are arranged in pairs and said compensating coils are arranged in pairs the pairs the pairs being circumferentially spaced from one another.

6. A load measuring device comprising a magnetic core formed by winding a belt of magnetic material in clockspring fashion into a toroidal shape with a central axis, at least one pair of transformer coupled active coils wound in a plane perpendicular to said axis through a corresponding number of first holes bored radially in the magnetic core, at least one pair of transformer coupled compensating coils wound in a plane parallel to the axis through a corresponding number of second holes bored radially in the magnetic core at positions circumferentially spaced from the first holes, means for applying a constant voltage to the primary winding of each of said coil pairs thereby to cause a current to flow therethrough and means for measuring a difference, caused by an application of a load to the magnetic core, between the currents flowing through the secondary winding of each of said active and compensating coils.

7. A load measuring device as set forth in claim 1 wherein supporting rings are provided on the inner and outer peripheral surfaces of said magnetic core.

8. A load measuring device as set forth in claim 7 wherein pressure receiving rings are also provided on the top and bottom surfaces of said magnetic core.

* * * * *